United States Patent [19]

Ballinger

[11] Patent Number: 5,436,787
[45] Date of Patent: Jul. 25, 1995

[54] SURGE ARRESTOR UNIT

[75] Inventor: Forrest H. Ballinger, Grain Valley, Mo.

[73] Assignee: Harmon Industries, Inc., Blue Springs, Mo.

[21] Appl. No.: 140,678

[22] Filed: Oct. 21, 1993

[51] Int. Cl.⁶ .............................................. H02H 3/22
[52] U.S. Cl. .................................. 361/128; 361/129; 361/126; 361/117
[58] Field of Search ............... 361/126, 129, 128, 127, 361/111, 112, 117, 119, 56, 91

[56]  References Cited

U.S. PATENT DOCUMENTS

| | | | |
|---|---|---|---|
| 2,923,849 | 2/1960 | Rees | 313/311 |
| 2,967,256 | 1/1961 | Rees | 313/581 |
| 3,056,068 | 9/1962 | Barker et al. | 361/119 |
| 3,204,322 | 9/1965 | Rees | 445/6 |
| 4,107,567 | 8/1978 | Cunningham et al. | 361/129 |
| 4,237,515 | 12/1980 | Pierce, Jr. | 361/127 |
| 4,237,516 | 12/1980 | Pierce, Jr. | 361/127 |

*Primary Examiner*—A. D. Pellinen
*Assistant Examiner*—Sally Medley
*Attorney, Agent, or Firm*—Chase & Yakimo

[57]  ABSTRACT

A three-terminal surge arrestor unit employs air gaps augmented with semiconductors to protect a circuit having two ungrounded conductors. Conductive electrodes and the semiconductors are mounted on a common axis in a sandwich arrangement and secured in fixed relative positions. Two air gap lightning arrestors provide current paths for the respective conductors to ground in response to lightning strikes or other damaging surges, and an equalizer is incorporated in the electrode configuration to establish a current path between the conductors to protect them from an excessive voltage differential. The resulting configuration is a single, three-terminal unit designed to replace multiple unit air gap systems and gas tube arrestors.

9 Claims, 3 Drawing Sheets

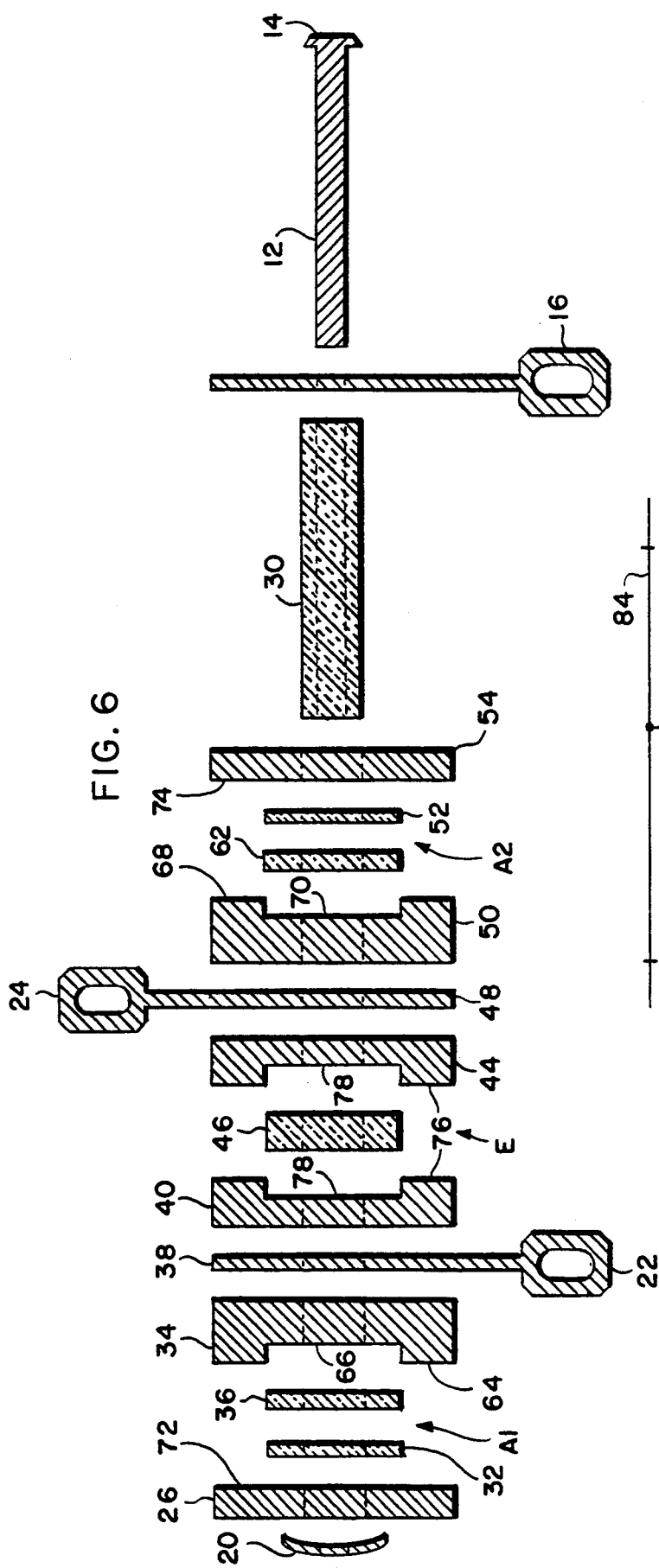
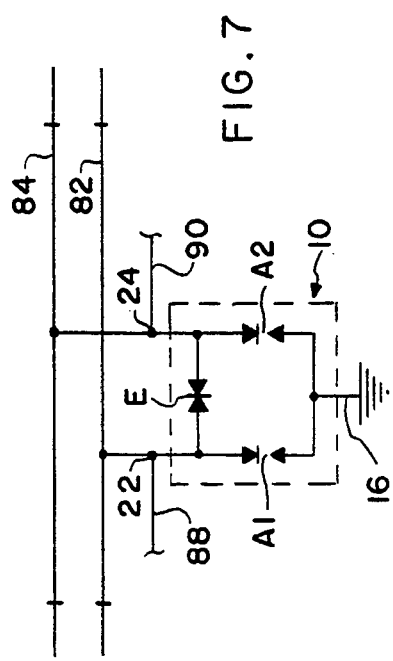

SURGE ARRESTOR UNIT

BACKGROUND OF THE INVENTION

This invention relates to improvements in surge arrestor devices for protecting an electrical circuit from a lightning strike or other abnormal surge in potential and, in particular, to an arrestor unit which combines both a path to ground and means to equalize the potential between two conductors of the circuit that may be subjected to an excessive voltage differential as a result of the surge.

Air gap arrestors have been widely used for decades in applications where there is a need to protect a circuit involving two conductors, neither of which is electrically connected to earth ground. Since a lightning discharge generally seeks a current path to ground, protecting the circuit requires that a path to ground be provided without grounding the circuit for normal use. Also, due to the presence of two ungrounded conductors, the potential therebetween must be equalized, or the differential minimized, in the event that the two conductors are subjected to unequal levels of coupling from the lightning surge. Otherwise, this can result in an excessive voltage differential between the conductors that may be damaging to the equipment with which the circuit is associated.

Two different types of air gap devices, known as arrestors and equalizers, have been used to provide a ground path for the surge and the necessary equalization of the potential between the two conductors. A typical application is in a railroad signal environment where relatively low-voltage trackside equipment is to be protected. Track circuits are ungrounded, i.e., both conductors are isolated from earth ground. Each conductor is at the potential of a corresponding rail of the track, and both rails may be isolated in a given track section by insulated joints. In a typical installation an air gap arrestor is connected between each conductor and ground. An equalizer is connected across the conductors. Such an arrangement is, for example, shown and described in Rees, U.S. Pat. No. 3,204,322. The resulting configuration, therefore, involves three separate protection devices, two arrestors and an equalizer.

Surge protection has also been provided by gas tube arrestors, a device which in a widely used configuration contains three electrodes enclosed within a sealed chamber. Two electrodes are connected to the respective circuit conductors, and the third electrode is connected to ground. Once an arc is established as a result of a surge, the gas within the chamber becomes highly ionized and the arc expands to contact all three electrodes almost immediately. This brings all three electrodes to the same potential and eliminates the need for the separate equalizer used in the air gap approach.

Although the gas tube arrestor provides all functions within a single unit and eliminates the need for separate components, it does have several disadvantages. A heavy discharge tends to release metallic particles from the electrodes. Since the particles cannot escape from the sealed chamber, a deposit may be formed on the walls of the container and limit the life of the arrestor as eventually a conducting path can be formed between the electrodes. Also, melting of the electrodes can occur and cause a possible short circuit within the tube.

SUMMARY OF THE INVENTION

It is, therefore, the primary object of the present invention to provide a surge arrestor which combines some of the better features of the three-piece air gap system (two arrestors and an equalizer) and the three-terminal gas tube device, by providing a three-terminal surge arrestor unit which handles both the arrestor and equalizer functions within a single unit but accomplishes both functions in an air environment.

In furtherance of the foregoing object, it is an important aim of this invention to provide a surge arrestor unit having electrodes spaced from one another on a common axis and arranged to provide an air-gap lightning arrestor for each of the two conductors of the protected circuit and an equalizer between the two conductors.

Another important object of the present invention is to provide a construction for the surge arrestor unit employing an insulated core member defining a common axis for the electrodes and providing a common mounting means for the electrodes that permits them to be secured on the core member in fixed relative positions.

Still another important object of the invention is to provide a surge arrestor unit as aforesaid in which the conductive electrodes of the unit, semiconductive components and terminals are all mounted on a common axis in a sandwich arrangement and secured in fixed relative positions.

A further and important object is to provide a three-terminal surge arrestor unit which can be installed as a direct replacement for the three-terminal gas tube, and which will also replace multiple unit air gap and other gas tube arrestor systems with a single, smaller and more efficient functional unit.

Other objects will become apparent as the detailed description proceeds.

DESCRIPTION OF THE DRAWINGS

FIG. 6 is an exploded, diagrammatic representation of the various components of the unit as seen looking perpendicularly of the axis.

FIG. 7 is an electrical schematic diagram of the unit shown connected to a track circuit.

DETAILED DESCRIPTION

Figure 1:
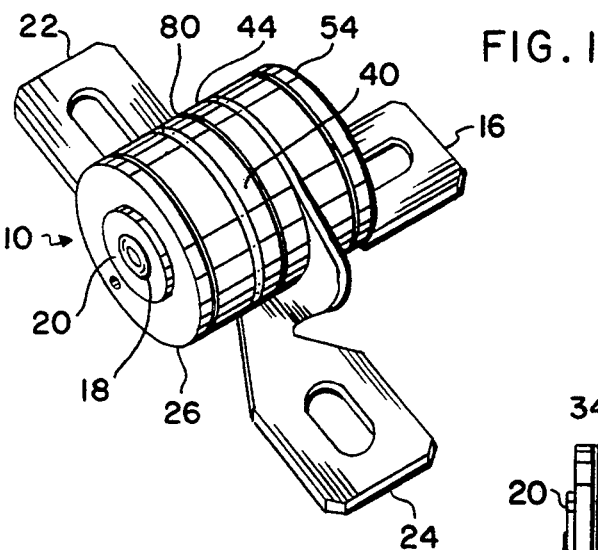
FIG. 1 is a perspective view of the surge arrestor unit of the present invention.
Figure 2:
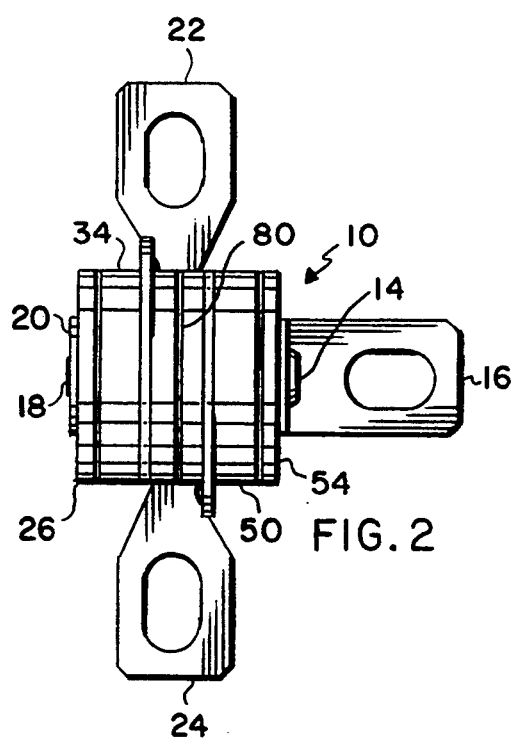
FIG. 2 is a top plan view of the unit.
Figure 3:
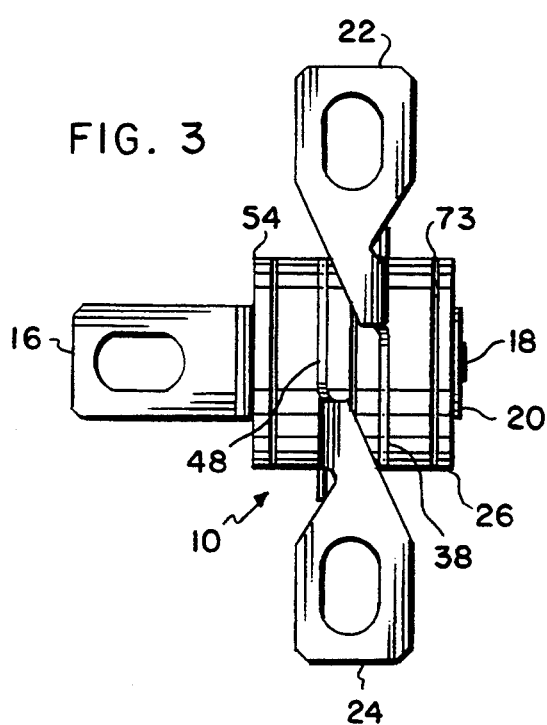
FIG. 3 is a bottom view of the unit.
Figure 4:
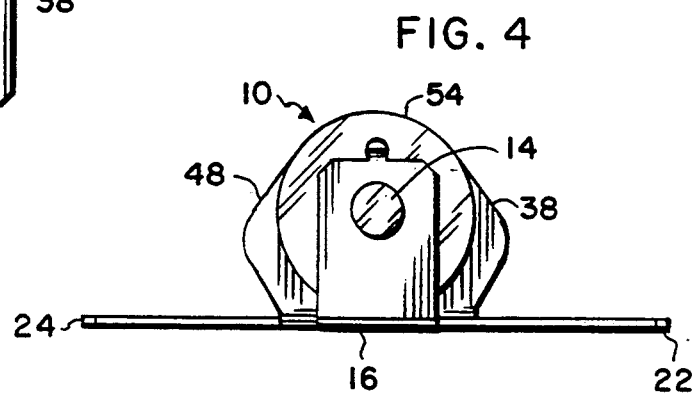
FIG. 4 is an end view of the unit looking at the projecting ground terminal.
Figure 5:
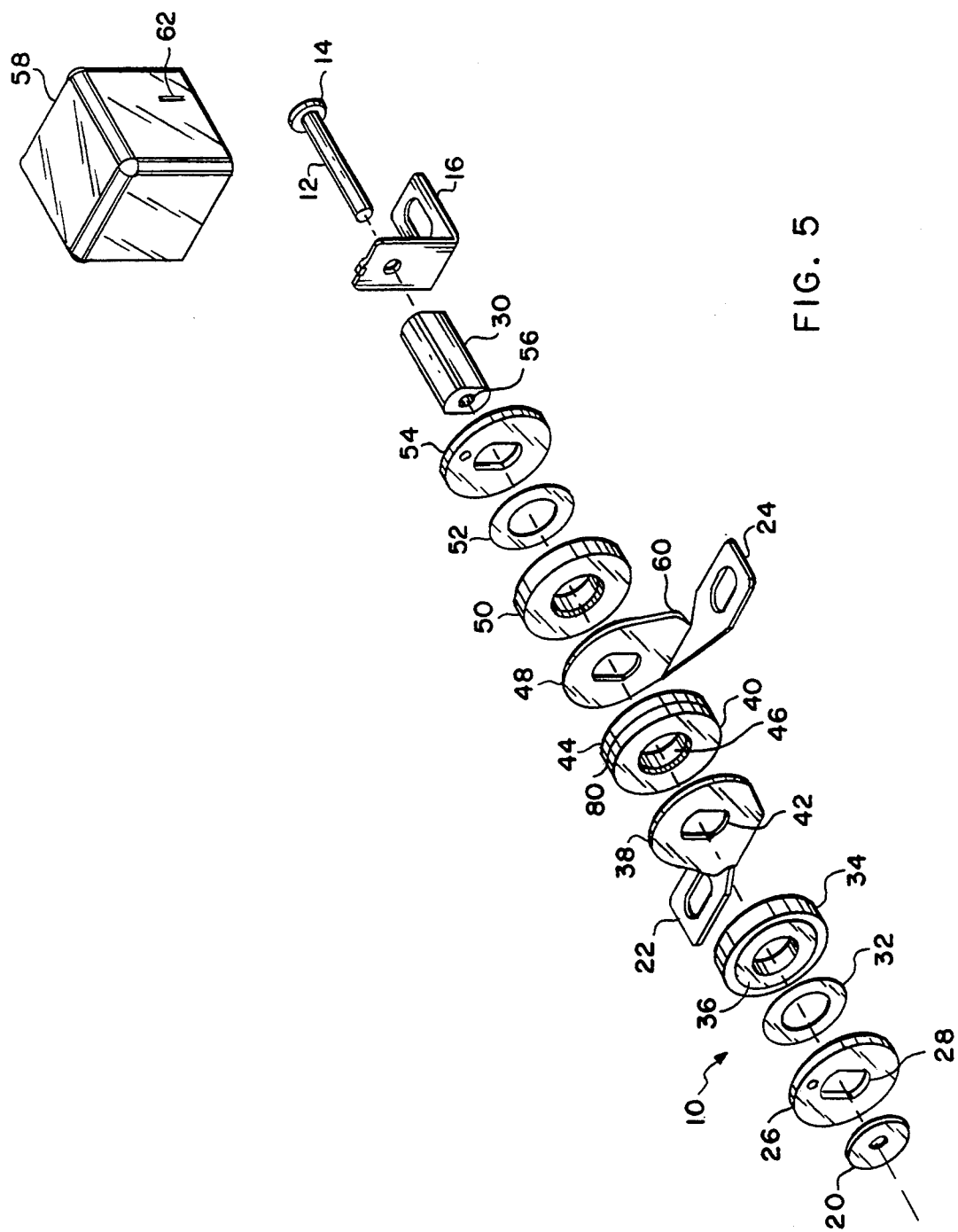
FIG. 5 is a view showing individual components and subassemblies of the unit exploded along their common axis, and a protective cover not seen in FIGS. 1–4.

The three-terminal surge arrestor unit of the present invention is shown fully assembled in FIGS. 1–4, and comprises a number of disk-shaped electrodes (described in detail below) secured together in sandwich fashion to present a cylindrical assembly 10. FIG. 5 shows the cylindrical assembly 10 exploded along the axis of the cylinder and reveals a metal rivet 12 coaxial with the electrodes and other components, the head 14 of rivet 12 being visible in FIGS. 2 and 4 engaging an L-shaped ground terminal 16 at one end of the assembly 10. The opposite, flattened end 18 of rivet 12 (FIGS. 1–3) bears against a Bellevue washer 20 to securely hold the individual components of the cylindrical assembly 10 together in fixed relative positions. Two terminals 22 and 24 (for connection to a circuit to be protected) project radially from assembly 10 in opposite directions to complete the three-terminal configuration.

Referring particularly to FIG. 5, the various components of the cylindrical assembly 10 will be described from left to right in the exploded view, i.e., from washer 20 to ground terminal 16. Washer 20 bears against a metal disk 26 comprising one of the ground electrodes of the unit. It is preferably composed of nickel-plated brass and is circular in configuration, a non-circular opening 28 being provided through its center for complementally receiving an insulated core member 30 through which the axial rivet 12 extends. The next component is an insulated washer 32 followed by an outer, disk-shaped metal electrode component 34 which is configured to receive a semiconductive insert 36. The inner surface of electrode component 34 is flush against a metal plate element 38 forming an integral part of terminal 22, element 38 being sandwiched between outer electrode component 34 and an inner electrode component 40 to electrically interconnect the components 34 and 40 with terminal 22. A noncircular central opening 42 through element 38 receives core member 30 and holds the parts against relative rotation.

A disk-shaped, conductive inner electrode component 44 is shown in FIG. 5 forming a subassembly with inner component 40 as these components are configured to receive a semiconductive insert 46 as will be discussed with reference to FIG. 6. Continuing along the axis, a metal plate element 48 is an integral part of terminal 24 and is sandwiched between inner component 44 and an outer, disk-shaped, conductive electrode component 50. Accordingly, inner component 40 and outer component 34 may be viewed functionally as a single electrode to which terminal 22 is connected, and inner component 44 and outer component 50 may be viewed as a second electrode to which terminal 24 is connected.

The remaining parts seen in FIG. 5 are insulated washer 52 and a ground electrode 54 identical in configuration to electrode 26. It may be appreciated that core member 30, composed of insulating material, has an axial bore 56 receiving the shank of rivet 12. Also, a protective cover 58 is shown in FIG. 5 and is snapped in place over the metal plate elements 38 and 48. The edges of the plate elements 38 and 48 are configured to present opposed tabs received in slots in cover 58, one such tab and slot being revealed at 60 and 62 respectively in FIG. 5.

All of the individual components of the cylindrical assembly 10 are illustrated diagrammatically in FIG. 6 in an axially exploded view. (Being a diagrammatic illustration, it should be understood that the terminals 16, 22 and 24 are depicted in a simplified form and not as they physically appear in FIGS. 1-5.) Shading is applied to show that a particular component or part is either electroconductive, semiconductive or an insulating material. The insulators comprise the hollow core member 30 and the washers 32 and 52. The conductive parts comprise rivet 12, Bellevue washer 20, the terminals 16, 22 and 24, ground electrodes 26 and 54, and electrode components 34, 40 and 44, 50. All of the conductive electrodes and electrode components are preferably nickel-plated brass as mentioned above. The remaining parts seen in FIG. 6 are semiconductors and include washer-like inserts 36 and 46 and a second insert 62 identical to insert 36 but associated with electrode component 50. These semiconductive components are preferably composed of silicon carbide or a similar semiconductive material.

The outer electrode component 34 presents an outer surface 64 having a circular recess 66 therein receiving semiconductive insert 36, which is held by a press fit. Likewise, outer electrode component 50 presents an outer surface 68 having a circular recess 70 receiving semiconductive insert 62, which is also held by a press fit. Ground electrode 26 has an inner surface 72 which faces outer surface 64 and is spaced therefrom when the unit is assembled to provide a discharge gap 73 (FIGS. 1-3) between electrodes 26 and 34, such spacing being maintained by the insulated washer 32. In identical fashion, ground electrode 54 presents an inner surface 74 that defines a discharge gap 75 (FIGS. 1-3) with the facing outer surface 68 of electrode component 50, the necessary spacing being maintained by the insulated washer 52. These two arrestor subassemblies A1 and A2 to the left and right of terminals 22 and 24 respectively, present two surge paths to ground from terminals 22 and 24 to ground terminal 16. It should be noted in this respect that the rivet 12 and Bellevue washer 20 electrically interconnect the end, ground electrodes 26 and 54 of assembly 10.

An equalizer E for protecting ungrounded conductors connected to terminals 22 and 24 is provided by inner electrode components 40 and 44 and the semiconductive disk insert 46 sandwiched therebetween. The electrode components 40 and 44 present a pair of inwardly facing, gap-defining surfaces 76, each of which has a circular recess 78 receiving the semiconductive disk 46. The disk 46 has a greater thickness than the combined depths of the two recesses 78, so that when fully received therein an air gap 80 (FIGS. 1-3 and 5) remains between the surfaces 76.

Referring to FIG. 7, use of the surge arrestor unit of the present invention in a railroad signal environment is illustrated. The railroad track has rails 82 and 84; two conductors 88 and 90 extend to trackside signaling equipment (not shown) which is to be protected. The assembly 10 of the present invention is connected to conductors 88 and 90 via terminals 22 and 24, respectively, which are in turn connected to rails 82 and 84. Terminal 16 of the unit is, of course, connected to an earth ground.

The two arrestors A1 and A2 operate in a manner well known in the art and as described, for example, in Rees, U.S. Pat. No. 2,923,849. The semiconducting disk inserts 36 and 62 of the two arrestors are effective to initiate ionization of the air in the gaps 73 and 75 between the conductive electrodes 26, 34 and 68, 74 of arrestors A1 and A2 respectively. Use of the semiconductive disks 36 and 62 enables the air gaps 73 and 75 to be wider than would otherwise be required for protection against lightning strikes and other abnormal surges in potential.

It will be appreciated, however, that the conductors 88 and 90 and corresponding rails 82 and 84 are isolated from ground and that, therefore, one conductor could attract a much higher surge than the other or the voltage on both could rise simultaneously but one of the arrestors A1 or A2 could conduct first. This could result in an excessive voltage differential between the two conductors 88 and 90 and cause damage to the equipment to be protected. Accordingly, the semiconductive disk 46 in the equalizer E bridges the gap-defining surfaces 76 and directly electrically interconnects the two conductive electrode components 40 and 44. Disk 46 presents a relatively high resistance during normal circuit operation (on the order of 1,000 ohms), and thus provides a resistive leakage path across the conductive electrodes and air gap 80. The normal voltages in the protected circuit being relatively low, on the order of 12 volts for railroad applications, the leakage current is small but does minimize the voltage across the equalizer electrodes. Should the voltage differential reach an excessive level, ionization occurs in the gap 80 and the equalizer then acts as an arrestor to discharge the excess surge. The operation of equalizers of this type is well known in the art and is described, for example, in the Rees patent mentioned earlier in this specification, U.S. Pat. No. 3,204,322.

As may be appreciated from the foregoing, the present invention provides a three-terminal surge arrestor unit incorporating arrestors A1 and A2 and equalizer E in a unitary assembly 10 in which all of the electrodes and other components are organized on a common axis to provide a single unit which accomplishes all of the protective functions. The unit can be installed as a direct replacement for three-piece air gap systems and has the advantage of providing a smaller, single piece package with attendant space reduction and easier mounting requirements. As a replacement for arrestors of the gas tube type, the present invention provides inherent protection against shorting between electrodes as the exposed air gaps 73, 75 and 80 permit metallic particles released from the electrodes during a discharge to escape.

Having thus described the invention, what is claimed as new and desired to be secured by Letters Patent is:

1. An electrical surge arrestor unit for protecting a relatively low voltage circuit having two ungrounded conductors, said arrestor unit comprising:
    an equalizer having first and second spaced, conductive electrodes presenting a pair of opposed outer surfaces, and means between and electrically interconnecting said electrodes for establishing a current path therebetween to minimize voltage across the electrodes,
    terminal means on said first and second electrodes for connecting the same to respective conductors of said circuit, whereby the equalizer protects the conductors from an excessive voltage differential,
    a third conductive electrode spaced from said first electrode and having an inner surface facing the outer surface of said first electrode,
    means sandwiched between said facing surfaces of the first and third electrodes for maintaining said facing surfaces in spaced relationship and providing a discharge gap therebetween,
    a fourth conductive electrode spaced from said second electrode and having an inner surface facing the outer surface of said second electrode,
    means sandwiched between said facing surfaces of the second and fourth electrodes for maintaining the same in spaced relationship and providing a discharge gap therebetween, and
    a common terminal structure interconnecting said third and fourth electrodes and having means for connecting the same to ground.

2. The arrestor unit as claimed in claim 1, wherein said electrodes are spaced from one another along a common axis.

3. The arrestor unit as claimed in claim 2, further comprising an insulated core member presenting said axis, said electrodes having axial openings therethrough receiving said member, there being fastening means securing said electrodes on said member in fixed relative positions.

4. The arrestor unit as claimed in claim 2, further comprising a hollow, insulated core member presenting said axis, said electrodes having axial openings therethrough receiving said member, said common terminal structure including a conductive fastener extending along said axis through said member, securing said electrodes on said member in fixed relative positions, and having means in electrical contact with said third and fourth electrodes.

5. The arrestor unit as claimed in claim 2, wherein each of said first and second electrodes comprises an inner electrode component and an outer electrode component axially spaced from each other, said terminal means including first and second conductive elements sandwiched between the inner and outer components of the first and second electrodes respectively, said outer components presenting said opposed outer surfaces of the first and second electrodes.

6. The arrestor unit as claimed in claim 5, further comprising an insulated core member presenting said axis, said electrodes and elements having axial openings therethrough receiving said member, there being fastening means securing said electrodes and elements on said member in fixed relative positions.

7. The arrestor unit as claimed in claim 5, further comprising a hollow, insulated core member presenting said axis, said electrodes and elements having axial openings therethrough receiving said member, said common terminal structure including a conductive fastener extending along said axis through said member, securing said electrodes and elements on said member in fixed relative positions, and having means in electrical contact with said third and fourth electrodes.

8. An electrical surge arrestor unit for protecting a relatively low voltage circuit having two ungrounded conductors, said arrestor unit comprising:
    an equalizer having first and second spaced, conductive electrodes presenting a pair of inwardly facing, gap-defining surfaces and a pair of opposed outer surfaces, and a semiconductor between and electrically bridging said gap-defining surfaces,
    terminal means on said first and second electrodes for connecting the same to respective conductors of said circuit, whereby the equalizer reduces the voltage differential across the conductors and provides ionization in the gap if the differential reaches an excessive level,
    a third conductive electrode spaced from said first electrode and having an inner surface facing the outer surface of said first electrode,
    means sandwiched between said facing surfaces of the first and third electrodes for maintaining said facing surfaces in spaced relationship and providing a discharge gap therebetween,
    a fourth conductive electrode spaced from said second electrode and having an inner surface facing the outer surface of said second electrode,
    means sandwiched between said facing surfaces of the second and fourth electrodes for maintaining the same in spaced relationship and providing a discharge gap therebetween, and
    a common terminal structure interconnecting said third and fourth electrodes and having means for connecting the same to ground.

9. A three-terminal electrical surge arrestor unit for protecting a relatively low voltage circuit having two ungrounded conductors, said arrestor unit comprising:

an equalizer having first and second spaced, conductive electrodes presenting a pair of opposed outer surfaces, and means between and electrically interconnecting said electrodes for establishing a current path therebetween to minimize voltage across the electrodes, first and second terminals on said first and second electrodes respectively for connecting the same to corresponding conductors of said circuit, whereby the equalizer protects the conductors from an excessive voltage differential, a third conductive electrode spaced from said first electrode and having an inner surface facing the outer surface of said first electrode, means sandwiched between said facing surfaces of the first and third electrodes for maintaining said facing surfaces in spaced relationship and providing a discharge gap therebetween, a fourth conductive electrode spaced from said second electrode and having an inner surface facing the outer surface of said second electrode, means sandwiched between said facing surfaces of the second and fourth electrodes for maintaining the same in spaced relationship and providing a discharge gap therebetween, means mounting said electrodes in said spaced relationship along a common axis, and an axially extending terminal structure interconnecting said third and fourth electrodes and presenting a third terminal for connecting the third and fourth electrodes to ground.

* * * * *